United States Patent Office 3,040,048
Patented June 19, 1962

---

3,040,048
SPIRAN COMPOUNDS AND METHODS FOR THEIR PRODUCTION
Erik F. Godefroi, Harper Woods, Mich., assignor to Parke, Davis & Company, Detroit, Mich., a corporation of Michigan
No Drawing. Filed June 23, 1958, Ser. No. 743,990
7 Claims. (Cl. 260—283)

The present invention relates to 3',4'-dihydrospiro[cyclohexane-1,1'(2'H)-isoquinoline], to N-alkyl and N-hydroxyalkyl derivatives of this compound, to non-toxic acid-addition salts thereof, and to methods for their production.

The novel compounds of this invention can be represented, as their free bases, by the structural formula

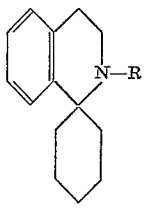

In this formula, R can represent hydrogen, a lower alkyl radical or a lower hydroxyalkyl radical. When R represents a lower alkyl radical, it is preferably selected from among alkyl radicals containing not more than 6 carbon atoms and can, therefore, represent methyl, ethyl, propyl, butyl, amyl, hexyl and branched-chain isomers of the foregoing.

In the manufacture of compounds of this invention, the cyclic amide, 3',4'-dihydro-3'-oxospiro-[cyclohexane-1,1'(2'H)-isoquinoline] of the structural formula

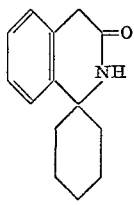

is subjected to reduction in order to convert the carbonyl group to a methylene group. A variety of reducing agents can be used for this purpose. For example, the reduction of the cyclic amide can be achieved in high yield by catalytic hydrogenation under high pressure using copper-chromium oxide (copper chromite) catalyst. This hydrogenation proceeds well under pressures of about 3500–5000 lbs./sq. inch of hydrogen at temperatures of 150–250° C. The reduction with copper chromite catalyst is carried out in the presence of an unreactive solvent such as dioxane, cyclohexane, methanol, ethanol or piperidine. Good results are obtained by preparing the copper chromite catalyst according to the procedure of Adkins et al., "Journal of the American Chemical Society," 72, 2626 (1950) and using a quantity of the catalyst equal in weight to the amide being reduced.

The reduction of the amide can also be carried out with an alkali metal hydride reducing agent such as lithium aluminum hydride. This reaction can be conducted in an unreactive solvent such as diethyl ether, dipropyl ether, tetrahydrofuran, benzene, toluene, or xylene and is commonly carried out by heating for one hour or longer at the reflux temperature of the solvent although appreciable conversion also takes place at room temperatures or below. Due to the relative insolubility of the cyclic amide in ethereal and hydrocarbon solvents, it is usually preferable to introduce the amide into the reaction mixture gradually by a continuous extraction procedure.

The cyclic amide, 3',4'-dihydro-3'-oxospiro-[cyclohexane-1,1'(2'H)-isoquinoline], used as a starting material in the process of this invention, can be obtained by the reaction of phenylacetamide and cyclohexanone in the presence of polyphosphoric acid or a mixture of phosphorus pentoxide and phosphoric acid; Canadian Journal of Chemistry, 35, 662 (1957).

The N-alkyl derivatives of this invention can be prepared by alkylating the amino group of 3',4'-dihydrospiro[cyclohexane-1,1'(2'H)-isoquinoline]. The alkylation can be carried out directly by reaction with an alkyl halide, sulfate, or sulfonate. Methylation can be accomplished by reaction with a mixture of formaldehyde and formic acid. The alkylation can also be carried out in a step-wise fashion by first acylating the amine with a carboxylic acid anhydride or halide and then reducing the carbonyl group in the resulting amido compound with an alkali metal hydride such as lithium aluminum hydride under anhydrous conditions in an unreactive solvent, such as ether, tetrahydrofuran or benzene.

The N-hydroxyalkyl derivatives of this invention can be prepared by hydroxyalkylating the amino group of 3',4'-dihydrospiro[cyclohexane-1,1'(2'H) - isoquinoline]. A variety of procedures are suitable for this purpose, for example, the amine can be reacted with a haloalkanoic acid ester and the resultant product reduced to the alcohol. Thus, the N-β-hydroxyethyl derivative is obtained by reacting the amine with ethyl bromoacetate (using an excess of the amine to combine with liberated hydrogen bromide) and reducing the resulting N-ethoxycarbonylmethyl derivative with a hydride such as lithium aluminum hydride. The same compound is obtained by reaction of the amine with ethylene oxide or with 2-bromoethanol. Other compounds of the N-hydroxyalkyl series are obtained by hydroxyalkylation with an alkylene oxide or with a haloalkanol or by the sequence of steps comprising reaction with a haloalkanoic acid ester and reduction.

In the formation of the desired N-alkyl and N-hydroxyalkyl derivatives from the cyclic amide, 3',4'-dihydro-3'-oxospiro[cyclohexane-1,1'(2'H)-isoquinoline], it is also satisfactory to reverse the order of operations so that alkylation or hydroxyalkylation of the amino group

is carried out first, followed by reduction of the carbonyl group.

In the applications of this invention, the compounds can be employed as free bases or in the form of non-toxic acid-addition salts formed by admixture with a variety of inorganic and organic acids. Among such acids are hydrochloric, hydrobromic, hydriodic, sulfuric, acetic, benzoic, citric, maleic, malic, gluconic, ascorbic and related acids.

The compounds of this invention are valuable pharmacological agents. They are depressants of the central nervous system and, in particular, are cataleptoid and anti-convulsive agents. They are useful in anethesia and in the treatment of states of hyper-excitability.

The invention is illustrated, but not limited, by the following examples:

*Example 1*

To a mixture of 140 g. of phosphorus pentoxide and 140 g. of 85% phosphoric acid is added 12 g. of phenylacetamide and 9 g. of cyclohexanone. The reaction mixture is heated at 95–100° C. for 8 hours and is then poured into 1 liter of water. The precipitated product is collected on a filter, washed with ether and redissolved in 35 ml. of hot benzene. The solution is filtered and the hot filtrate is diluted with 60 ml. of isooctane and allowed to cool. The product which separates is collected and recrystallized from a mixture of benzene and isooctane to give 3',4' - dihydro - 3' - oxospiro[cyclohexane-1,1'(2'H)-isoquinoline] melting at about 178–179° C.

To a solution of 5 g. of 3',4'-dihydro-3'-oxospiro[cyclohexane-1,1'(2'H)-isoquinoline] in 250 ml. of dioxane is added 5 g. of copper chromite catalyst. The reaction mixture is placed in a high pressure hydrogenator under a pressure of about 4100 lbs./sq. inch of hydrogen and heated with continuous agitation. The reaction proceeds readily when the temperature reaches about 150° C. The reaction is continued until the theoretical amount of hydrogen is consumed. This requires a period of about 2 hours during which time the temperature is gradually raised from about 150 to 250° C. The cooled reaction mixture is then filtered, and the filtrate brought to dryness by distillation under reduced pressure. A solution of the residue in 100 ml. of ether is treated with a slight excess of hydrogen chloride in isopropyl alcohol, and the precipitated product is collected on a filter and recrystallized from a mixture of methanol and ether. This compound is 3'4' - dihydrospiro[cyclohexane - 1,1' - (2'H)-isoquinoline] hydrochloride which melts at about 268–269° C. The structural formula of the free base is

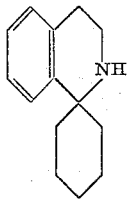

*Example 2*

A suspension of 6 g. of lithium aluminum hydride in 600 ml. of anhydrous ether is heated under reflux in conjunction with a continuous extractor containing 5.5 g. of 3',4' - dihydro - 3' - oxospiro[cyclohexane - 1,1'(2'H)-isoquinoline] so that the latter compound is gradually introduced into the reaction mixture. It is satisfactory to carry out this operation in a 3-necked flask containing a stirrer in one neck and a Soxhlet apparatus in one of the other necks. The ethereal suspension is stirred and heated under reflux until all of the 3',4'-dihydro-3'-oxospiro[cyclohexane - 1,1'(2'H) - isoquinoline] is removed from the extractor and for several hours thereafter. A reflux period of 18 hours is a typical reaction time. The mixture is then decomposed by the successive addition of 6 ml. of water, 4.5 ml. of 20% sodium hydroxide solution and 21 ml. of water. The entire mixture is filtered, and the ethereal solution is treated with an excess of hydrogen chloride in isopropyl alcohol and cooled. The precipitated product is collected on a filter and recrystallized from a mixture of methanol and ether to give 3',4'-dihydrospiro[cyclohexane - 1,1'(2'H) - isoquinoline] hydrochloride which melts at about 268–269° C. and is identical with the product of Example 1. The free base is obtained by making an aqueous solution of the hydrochloride basic with sodium hydroxide. The desired product, 3',4' - dihydrospiro[cyclohexane - 1,1'(2'H) - isoquinoline], is isolated by extraction with ether and evaporation of the solvent.

*Example 3*

A reaction mixture prepared from 8.08 g. of 3',4'-dihydrospiro[cyclohexane - 1,1'(2'H) - isoquinoline], 3.32 ml. of absolute formic acid and 3.5 g. of 38% formaldehyde is heated at about 90–100° C. for 3 hours. It is then chilled, diluted with 30 ml. of ether, made basic with an excess of 5-normal sodium hydroxide solution, and extracted with several portions of ether. The combined ethereal extract is dried and treated with a slight excess of hydrogen chloride in isopropyl alcohol. The insoluble hydrochloride which separates is collected on a filter and recrystallized from a mixture of isopropyl alcohol and ether to afford the desired hydrochloride, M.P. about 243–244° C. The free base, N-methyl-3',4'-dihydrospiro[cyclohexane - 1,1' - (2'H) - isoquinoline], is obtained by making an aqueous solution of the hydrochloride basic. It has the structural formula

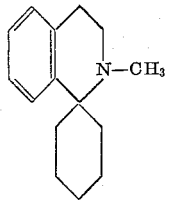

*Example 4*

A reaction mixture prepared from 8.08 g. of 3',4'-dihydrospiro[cyclohexane-1,1'(2'H)-isoquinoline], 4.3 ml. of acetic anhydride and 40 ml. of benzene is allowed to stand for 24 hours at about 25° C. and is then heated under reflux for 1 hour. The cooled mixture is washed successively with water, with dilute hydrochloric acid, and with dilute sodium bicarbonate solution. The benzene solution is evaporated to dryness and the residue is recrystallized from isooctane to afford N-acetyl-3',4'-dihydrospiro[cyclohexane - 1,1'(2'H) - isoquinoline], M.P. about 92–93° C. A solution of 6.8 g. of this compound in 15 ml. of warm benzene, diluted with 40 ml. of ether, is added over a 10-minute period to a stirred suspension of 2 g. of lithium aluminum hydride in 200 ml. of ether. The reaction mixture is heated under reflux for 3 hours, decomposed by the successive addition of 2 ml. of water, 1.5 ml. of 20% sodium hydroxide solution and 7.5 ml. of water, and filtered. The ethereal solution is rendered anhydrous and treated with a slight excess of hydrogen chloride in isopropyl alcohol. The precipitated product is collected and recrystallized from a mixture of methanol and ether to afford N-ethyl-3',4'-dihydrospiro[cyclohexane-1,1'(2'H)-isoquinoline] hydrochloride, M.P. about 246–247° C.

*Example 5*

A reaction mixture prepared from 4.04 g. of 3',4'-dihydrospiro[cyclohexane-1,1'(2'H)-isoquinoline], 2.2 g. of propionic anhydride and 40 ml. of benzene is allowed to stand at about 25° C. for 48 hours, following which it is washed successively with dilute hydrochloric acid and with dilute sodium bicarbonate solution. The separated benzene solution is dried and evaporated. The residue, which is crude N-propionyl-3',4'-dihydrospiro[cyclohexane-1,1'(2'H)-isoquinoline], is dissolved in 40 ml. of anhydrous ether and this ethereal solution is added gradually to a stirred suspension of 2 g. of lithium aluminum hydride in 200 ml. of ether. The reaction mixture is heated under reflux for 3 hours, cooled and decomposed by the successive addition of 2 ml. of water, 1.5 ml. of 20% sodium hydroxide solution and 7.0 ml. of water. The mixture is filtered and the ethereal phase is made anhydrous and evaporated to dryness. The residue is distilled in a vacuum to give N-propyl-3',4'-dihydrospiro[cyclohexane-1,1'(2'H)-isoquinoline]; this compound is collected as a fraction boiling at about 106–108° C. at 0.08 mm.

A water-soluble hydrobromide is obtained by treating an ethereal solution of this free base with a slight excess of hydrogen bromide in isopropyl alcohol.

A citrate is obtained by mixing methanolic solutions of the free base and citric acid and concentrating to a small volume.

*Example 6*

A reaction mixture prepared from 4.04 g. of 3',4'-dihydrospiro[cyclohexane-1,1'(2'H)-isoquinoline], 3.2 g. of butyric anhydride and 20 ml. of benzene is allowed to stand at about 25° C. for 24 hours and is then heated under reflux for 2 hours. The cooled mixture is washed with 1-normal hydrochloric acid and then with 5% aqueous sodium bicarbonate. The separated benzene phase is evaporated to dryness, affording a residue which is crude N-butyryl - 3',4' - dihydrospiro[cyclohexane - 1,1'-(2'H)-isoquinoline]. A solution of this residue in 50 ml. of ether is gradually added to a stirred suspension of 2 g. of lithium aluminum hydride in 200 ml. of ether. The stirred reaction mixture is heated under reflux for 3 hours and then decomposed by the successive addition of 2 ml. of water, 1.5 ml. of 20% sodium hydroxide solution and 7.0 ml. of water. This mixture is filtered and the ethereal solution is evaporated to dryness. The residue is distilled in a vacuum to afford N-butyl-3',4'-dihydrospiro[cyclohexane-1,1'(2-H)-isoquinoline]; B.P. about 106–108° C. at 0.08 mm.

*Example 7*

A mixture of 14.14 g. of 3',4'-dihydrospiro[cyclohexane-1,1'(2'H)-isoquinoline], 5.85 g. of ethyl bromoacetate and 50 ml. of anhydrous toluene is heated under reflux for 18 hours. The cooled reaction mixture is filtered in order to remove the insoluble precipitate of 3',4'-dihydrospiro[cyclohexane - 1,1'(2'H) - isoquinoline] hydrobromide which forms. The solvent is removed from the filtrate by distillation under reduced pressure. A solution of the residue in 60 ml. of ether is washed with water, rendered anhydrous over magnesium sulfate and then gradually added to a stirred suspension of 2 g. of lithium aluminum hydride in 150 ml. of ether. The stirred reaction mixture is heated under reflux for 2 hours and then cooled and decomposed by the successive addition of 2 ml. of water, 1.5 ml. of 20% sodium hydroxide and 7 ml. of water. This mixture is filtered and treated with an excess of hydrogen chloride in isopropyl alcohol. The precipitated product is collected on a filter and recrystallized from a mixture of methanol and ether. It is N-β-hydroxyethyl - 3',4' - dihydrospiro[cyclohexane - 1,1'-(2'H)-isoquinoline] hydrochloride melting at about 213–214° C. The free base, prepared by neutralization of an aqueous solution of the hydrochloride, has the structural formula

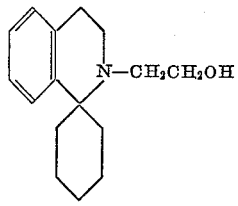

By the foregoing procedure, with the substitution of 6.8 g. of ethyl α-bromobutyrate for the ethyl bromoacetate, the product obtained is N-(α-ethyl-β-hydroxyethyl)-3',4'-dihydrospiro[cyclohexane-1,1'(2'H)-isoquinoline].

What is claimed is:

1. A compound of the class consisting of free bases and non-toxic acid-addition salts thereof, said free bases having the structural formula

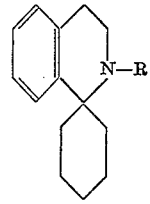

wherein R is a member of the class consisting of hydrogen, lower alkyl and lower hydroxyalkyl.

2. A compound having the structural formula

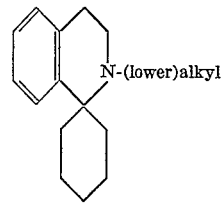

3. N - methyl - 3',4' - dihydrospiro[cyclohexane-1,1'(2'H)-isoquinoline].

4. N - ethyl - 3',4' - dihydrospiro[cyclohexane - 1,1'(2'H)-isoquinoline].

5. A compound having the structural formula

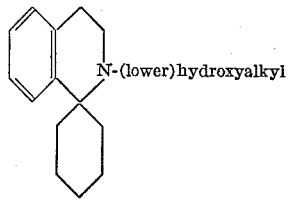

6. N - β -hydroxyethyl - 3',4' - dihydrospiro[cyclohexane-1,1'(2'H)-isoquinoline].

7. 3',4' - dihydrospiro[cyclohexane - 1,1'(2'H) -isoquinoline].

References Cited in the file of this patent

UNITED STATES PATENTS 2,665,276    Schwartzmann et al. _____ Jan. 5, 1954

OTHER REFERENCES

Belleau: Canadian J. Chem., vol. 35, page 662 (1957).